R. Cook,
Wood Auger.
N° 8,162.  Patented June 17, 1851.

UNITED STATES PATENT OFFICE.

RANSOM COOK, OF SARATOGA SPRINGS, NEW YORK.

AUGER.

Specification of Letters Patent No. 8,162, dated June 17, 1851.

*To all whom it may concern:*

Be it known that I, RANSOM COOK, of Saratoga Springs, in the county of Saratoga and State of New York, have invented new and useful Improvements in Boring Implements, known as "Augurs, Bits, and Gimlets;" and I do hereby declare that the following is a full, clear, and exact description of the construction and operation of the same, reference being had to the annexed drawings or prints with the letters of reference thereon as making a part of this specification.

Figure 1:
Figure 2:
Figure 4:

The nature of my improvements consist in giving to the lips or cutting edges of boring implements a curved or gouge shape at their extremities as illustrated in Figure 1 in connection or combination with the undercutting, or back-sloping of said edges, as illustrated in Figs. 2 and 4, between A and B, in order to give said edges a sliding askew or drawing movement in cutting.

To enable others skilled in the art to make and use my invention, I proceed to describe its construction and operation.

The body of the boring implement may be forged for this purpose in almost any of the forms now used, but, my cutting edges are most easily adapted to the twist or screw auger and the center bit. In drawing or plating for the screw auger with edges on my plan the extreme or cutting end should be left about square and thicker than for the ordinary lips. In hammering out the lips before turning them they should be extended from the screw on center farther than for right angular lips. These lips should also be hammered so as to have some projection downward, that is, project from the handle and somewhat in the form of a swallow's tail. Being thus forged, the lips may be turned nearly or quite in the form shown in Fig. 1. After the hammerwork is finished the lips are to be filed or dressed with the under back-slope as shown in Figs. 2 and 4, from A to B. No particular angle is essential in this slope, but the augers seem to work best and easiest when the slope is at about 45 degrees from the body of the auger. These implements are then to be tempered, finished and used in the same manner as the ordinary kinds. These boring implements cut so much easier than those now in use, that they require much less stock in their bodies and but a small screw to hold them to the wood.

What I claim as my invention and which I desire to secure by Letters Patent, is—

The form of the lips or cutting edges of boring implements as illustrated in Figs. 1, 2, and 4,—that is; such lip commencing at the screw or center point and running nearly at right angles thereto until about half way from the center to the outer part of the boring implement, when it assumes a curve upward or toward the handle end of the instrument, which curve is continued until it is nearly semicircular, or until it turns within the periphery of the auger or bit as shown in Fig. 1.—the curved edges being also undercut or backsloped as illustrated in Figs. 2 and 4, between A and B, but without being confined to any particular angle of such backsloping or under cutting; all as hereinbefore set forth.

RANSOM COOK.

Witnesses:
H. N. GILERT,
A. V. BUSKIRK.